United States Patent
Gao et al.

(10) Patent No.: US 12,198,453 B2
(45) Date of Patent: Jan. 14, 2025

(54) SYSTEMS AND METHODS FOR OPEN VOCABULARY OBJECT DETECTION

(71) Applicant: Salesforce, Inc., San Francisco, CA (US)

(72) Inventors: Mingfei Gao, Sunnyvale, CA (US); Chen Xing, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 359 days.

(21) Appl. No.: 17/587,161

(22) Filed: Jan. 28, 2022

(65) Prior Publication Data
US 2023/0154213 A1 May 18, 2023

Related U.S. Application Data

(60) Provisional application No. 63/280,072, filed on Nov. 16, 2021.

(51) Int. Cl.
| | | |
|---|---|---|
| G06V 20/62 | (2022.01) | |
| G06F 40/126 | (2020.01) | |
| G06T 1/60 | (2006.01) | |
| G06T 9/00 | (2006.01) | |
| G06V 10/22 | (2022.01) | |
| G06V 10/77 | (2022.01) | |
| G06V 10/774 | (2022.01) | |

(52) U.S. Cl.
CPC .......... *G06V 20/635* (2022.01); *G06F 40/126* (2020.01); *G06T 1/60* (2013.01); *G06T 9/00* (2013.01); *G06V 10/225* (2022.01); *G06V 10/7715* (2022.01); *G06V 10/7747* (2022.01)

(58) Field of Classification Search
None
See application file for complete search history.

(56) References Cited

U.S. PATENT DOCUMENTS

| | | | | |
|---|---|---|---|---|
| 10,061,999 | B1* | 8/2018 | Kwatra | G06V 20/52 |
| 10,198,671 | B1* | 2/2019 | Yang | G06V 10/768 |
| 10,558,750 | B2* | 2/2020 | Lu | G06N 3/082 |
| 10,726,306 | B1* | 7/2020 | Yang | G06V 10/768 |
| 11,651,522 | B2* | 5/2023 | Zhao | G06N 3/045 |
| | | | | 382/239 |
| 2018/0143966 | A1* | 5/2018 | Lu | G06F 18/2415 |
| 2020/0117951 | A1* | 4/2020 | Li | G06V 10/454 |

(Continued)

OTHER PUBLICATIONS

Alireza Zareian et al., Open-vocabulary object detection using captions. in CVPR, pp. 14393-14402, 2021.24.
(Continued)

*Primary Examiner* — Tahmina N Ansari
(74) *Attorney, Agent, or Firm* — Haynes and Boone, LLP (57) ABSTRACT

Embodiments described herein provide methods and systems for open vocabulary object detection of images. given a pre-trained vision-language model and an image-caption pair, an activation map may be computed in the image that corresponds to an object of interest mentioned in the caption. The activation map is then converted into a pseudo bounding-box label for the corresponding object category. The open vocabulary detector is then directly supervised by these pseudo box-labels, which enables training object detectors with no human-provided bounding-box annotations.

17 Claims, 8 Drawing Sheets

(56) References Cited

U.S. PATENT DOCUMENTS

| | | | |
|---|---|---|---|
| 2022/0012919 A1* | 1/2022 | Zhao | G06N 3/045 |
| 2023/0154213 A1* | 5/2023 | Gao | G06N 3/0455 |
| | | | 382/159 |

OTHER PUBLICATIONS

KJ Joseph et al., Towards open world object detection. in Proceedings of the IEEE/CVF Conference on Computer Vision and Pattern Recognition, pp. 5830-5840, 2021.

Pengkai Zhu et al., Zero shot detection. IEEE Transactions on Circuits and Systems for Video Technology, 30(4):998-1010, 2019.

Pengkai Zhu et al., Don't even look once: Synthesizing features for zero-shot detection. in CVPR, pp. 11693-11702, 2020.

Xiuye Gu et al., Zeroshot detection via vision and language knowledge distillation. arXiv:2104.13921, 2021.

Kaiming He et al., In Proceedings of the IEEE international conference on computer vision, pp. 2961-2969, 2017.

\* cited by examiner

| Method | Fine-tuned with Box Anno. on COCO Base Categories | Generalized Setting | | |
|---|---|---|---|---|
| | | Novel AP | Base AP | Overall AP |
| Bansal et al. | Yes | 0.3 | 29.2 | 24.9 |
| Zhu et al. | Yes | 3.4 | 13.8 | 13.0 |
| Rahman et al. | Yes | 4.1 | 35.9 | 27.9 |
| Zareian et al. | Yes | 22.8 | 46.0 | 39.9 |
| Our method | No | 25.8 | - | - |
| Our method | Yes | 30.8 | 46.1 | 42.1 |

FIG. 7

| Method | Fine-tuning | PASCAL VOC | Objects365 | LVIS |
|---|---|---|---|---|
| Zareian | COCO-base | 52.9 | 4.6 | 5.2 |
| Ours | None | 44.4 | 5.1 | 6.5 |
| Ours | COCO-base | 59.2 | 6.9 | 8.0 |

SYSTEMS AND METHODS FOR OPEN VOCABULARY OBJECT DETECTION

CROSS REFERENCES

The present disclosure is a nonprovisional of and claims priority under 35 U.S.C. 119 to U.S. provisional application No. 63/280,072, filed on Nov. 16, 2021, which is hereby expressly incorporated by reference herein in its entirety.

TECHNICAL FIELD

The embodiments relate generally to machine learning systems and open vocabulary object detection.

BACKGROUND

Object detection is a core task in computer vision. Current deep object detection methods achieve good performance when learning a pre-defined set of object categories which have been annotated in a large number of training images. Their success is still limited to detecting a small number of object categories (e.g., 80 categories). One reason is that most detection methods rely on supervision in the form of instance-level bounding-box annotations, hence requiring very expensive human labeling efforts to build training datasets. Some existing methods attempt to infer novel classes of objects, but these methods ultimately still rely heavily on human labeling. Therefore, there is a need to provide better open vocabulary object detection methods without human-provided bounding-box annotations.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Traditionally, object detection often relies on a human labeled bounding box of a potential object. The manual labor required for the labeling is costly and time-consuming. Embodiments described herein provide an object detection approach which does not rely on human bounding-box labeling. By taking advantage of the localization ability of pre-trained vision-language models, pseudo box annotations may be generated. In some embodiments, a pseudo bounding-box label may be automatically generated for a diverse set of objects from large-scale image-caption datasets.

Specifically, given a pre-trained vision-language model and an image-caption pair, an activation map may be computed based on the image and its caption, which corresponds to an object of interest mentioned in the caption. The activation map is then converted into a pseudo bounding-box label for the corresponding object category derived from the caption. An open vocabulary detector may then be directly supervised by these pseudo box-labels, which enables training object detectors with no human-provided bounding-box annotations.

There are numerous benefits of the methods and systems described herein. For example, since the method for generating pseudo bounding-box labels is fully automated with no manual intervention, the size of training data and the number of training object categories can be largely increased. This enables our approach to outperform existing zero-shot/open vocabulary detection methods trained with a limited set of base categories.

Figure 1:
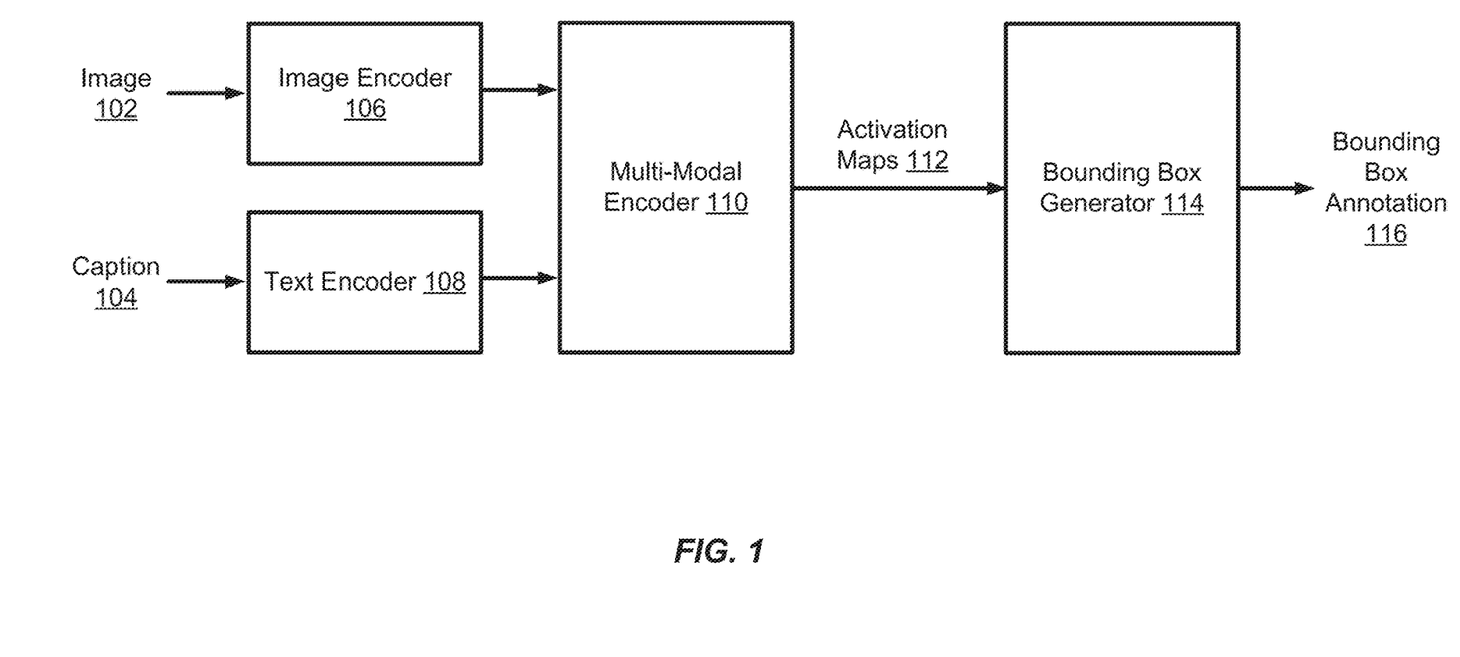
FIG. 1 is a simplified diagram showing an exemplary system architecture for generating bounding-box labels.

FIG. 1 is a simplified diagram showing an exemplary system architecture for generating bounding-box labels. An image 102, which may be represented as I, and its corresponding caption 104, which may be represented as $X=\{x_1, x_2, \ldots, x_{N_T}\}$, are the inputs to the model, where $N_T$ is the number of words in the caption (including [CLS] and [SEP]). An image encoder 106 is used to extract image features $V \in R^{N_V \times d}$ and a text encoder 108 is utilized to get text representations $T \in R^{N_T \times d}$. $N_V$ is the number of region representations of the image. Moreover, a multi-modal encoder 110 with L consecutive cross-attention layers is employed to fuse the information from both image and text encoders. In the l-th cross-attention layer, the interaction of an object of interest $x_t$ in the caption with the image regions is shown in the equations below, where $A_t^l$ denotes the corresponding visual attention scores at the l-th cross-attention layer. $h_t^{l-1}$ indicates the hidden representations obtained from the previous (l−1)-th cross-attention layer and $h_t^0$ is the representation of $x_t$ from the text encoder:

$$A_t^l = \text{Softmax}\left(\frac{h_t^{l-1} V^T}{\sqrt{d}}\right)$$

$$h_t^l = A_t^l * V$$

Thus, a cross-attention layer measures the relevance of the visual region representations with respect to a token in the input caption 104, and calculates the weighted average of all visual region representations accordingly. As a result, the visual attention scores $A_t^l$ can directly reflect how important the visual regions are to token $x_t$. Therefore, the activation maps 112 of such attention scores may be visualized to locate an object in an image given its name in the caption. After generating an activation map 112 of an object of interest in the caption 104 using this strategy, bounding box generator 114 may generate a bounding box covering the activated region as the bounding box annotation 116 of the category.

Figure 2:
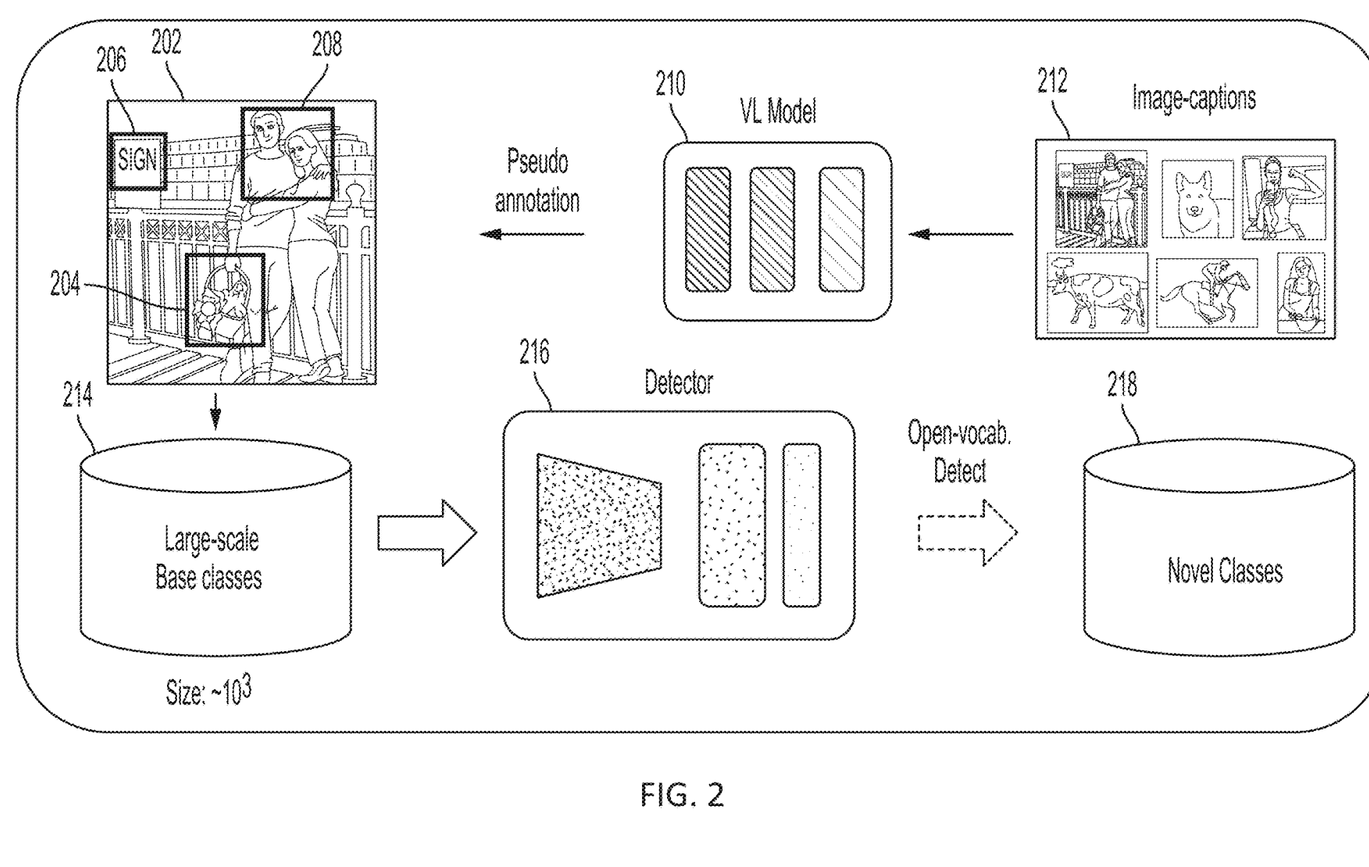
FIG. 2 is a simplified diagram showing an exemplary system architecture for image annotation and object detection.

FIG. 2 is a simplified diagram showing an exemplary system architecture for image annotation and object detection. Image/caption pairs 212 are used as inputs to a pre-trained vision-language model 210 such as the one described above with reference to FIG. 1. The vision-language model generates pseudo annotations of the image/caption pairs 212. For example, image 202 is annotated with bounding boxes 204, 206, and 208, which are associated with text embeddings. Using the pseudo bounding-box labels of the images, large scale base classes 214 may be generated. For example, using pseudo bounding-box labels could produce 1,000 base classes of identifiable objects, as compared to a model using human annotated images with only about 10 base classes. The large-scale base classes 214 may be used by a detector 216 to identify objects in different images. By using open vocabulary object detection supervised by the pseudo bounding-box annotations, additional novel classes 218 may be identified in addition to the base classes.

As this method for generating pseudo bounding-box labels is fully automated with no manual intervention, A large amount of training data and a great number of training object categories can be used without significantly increasing manual labor. Therefore, this approach outperforms existing zero-shot/open vocabulary detection methods trained with a limited set of base categories, even without relying on human-provided bounding boxes.

Figure 3:
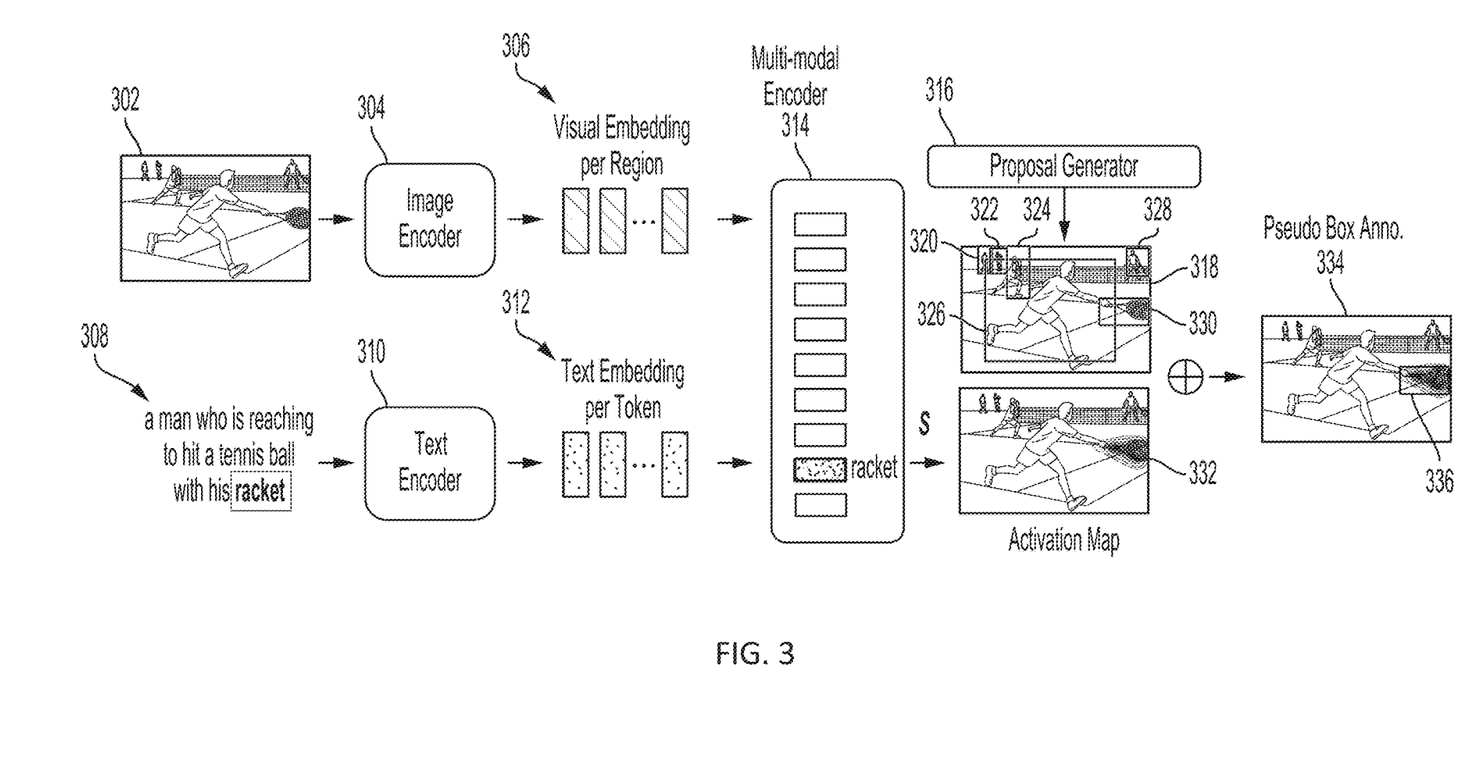
FIG. 3 is an illustration of a pseudo box label generation method according to aspects of the present disclosure.

FIG. 3 is a more detailed illustration of a pseudo box label generation method according to aspects of the present disclosure. The pseudo box label generation method generates pseudo bounding-box annotations for objects of interest in an image, by leveraging the implicit alignment between regions in the image and words in its corresponding caption in a pre-trained vision-language model.

An image 302 and its corresponding caption 308 are inputs to the model. An image encoder 304 is used to extract image features 306, and a text encoder 310 is used to get text representations 312. A multi-modal encoder 314 with L consecutive cross-attention layers is employed to fuse the information from both the image encoder 304 and the text encoder 310. A cross-attention layer measures the relevance of the visual region representations with respect to a token in the input caption, and calculates the weighted average of all visual region representations accordingly. As a result, the visual attention scores can directly reflect how important the visual regions are to each token. Therefore, an activation map 332 may be visualized of such attention scores to locate an object in an image given its name in the caption.

For example, one visualization method utilizes Grad-CAM as described in Selvaraiu et al., Grad-cam: Visual explanations from deep networks via gradient-based localization, in Proceedings of the IEEE international conference on computer vision, pages 618-626, 2017. Using Grad-CAM as the visualization method, and following its original setting to take the final output s from the multi-modal encoder 314, and calculate its gradient with respect to the cross-attention scores. s is a scalar that represents the similarity between the image 302 and its caption 308. Specifically, the final activation map $\Phi_t$ of the image given an object name $x_t$ is calculated as $$\Phi_t = A_t^l * \max\left(\frac{\partial s}{\partial A_t^l}, 0\right)$$

In practice, if there are multiple attention heads in one cross-attention layer, the activation map $\Phi_t$ is averaged from all attention heads as the final activation map.

After generating an activation map 332 of an object of interest in the caption 308 using this strategy, bounding box proposal generator 316 may generate a bounding box covering the activated region as the pseudo label of the category. A pre-trained proposal generator 316 may be used to generate proposal candidates B={$b_1, b_2, \ldots, b_K$} and select the one that overlaps the most with $\Phi_t$:

$$\hat{b} = \text{argmax}_i \frac{\sum_{b_i} \Phi_t(b_i)}{\sqrt{b_i}}$$

Where $\Sigma_{b_i} \Phi_t(b_i)$ indicates summation of the activation map 332 within a box proposal and |$b_i$| indicates the proposal area. In practice, a list of objects of interest may be maintained (referred as object vocabulary) during training and pseudo bounding-box annotations may be generated for all objects in the training vocabulary. For example, proposal generator 316 may be used to generate proposal candidates 320, 322, 324, 326, 328, and 330. Proposal candidate 330 which overlaps the most with the activation map for "racket" may be selected, as the bounding box 336 for the pseudo box annotation 334.

Figure 4:
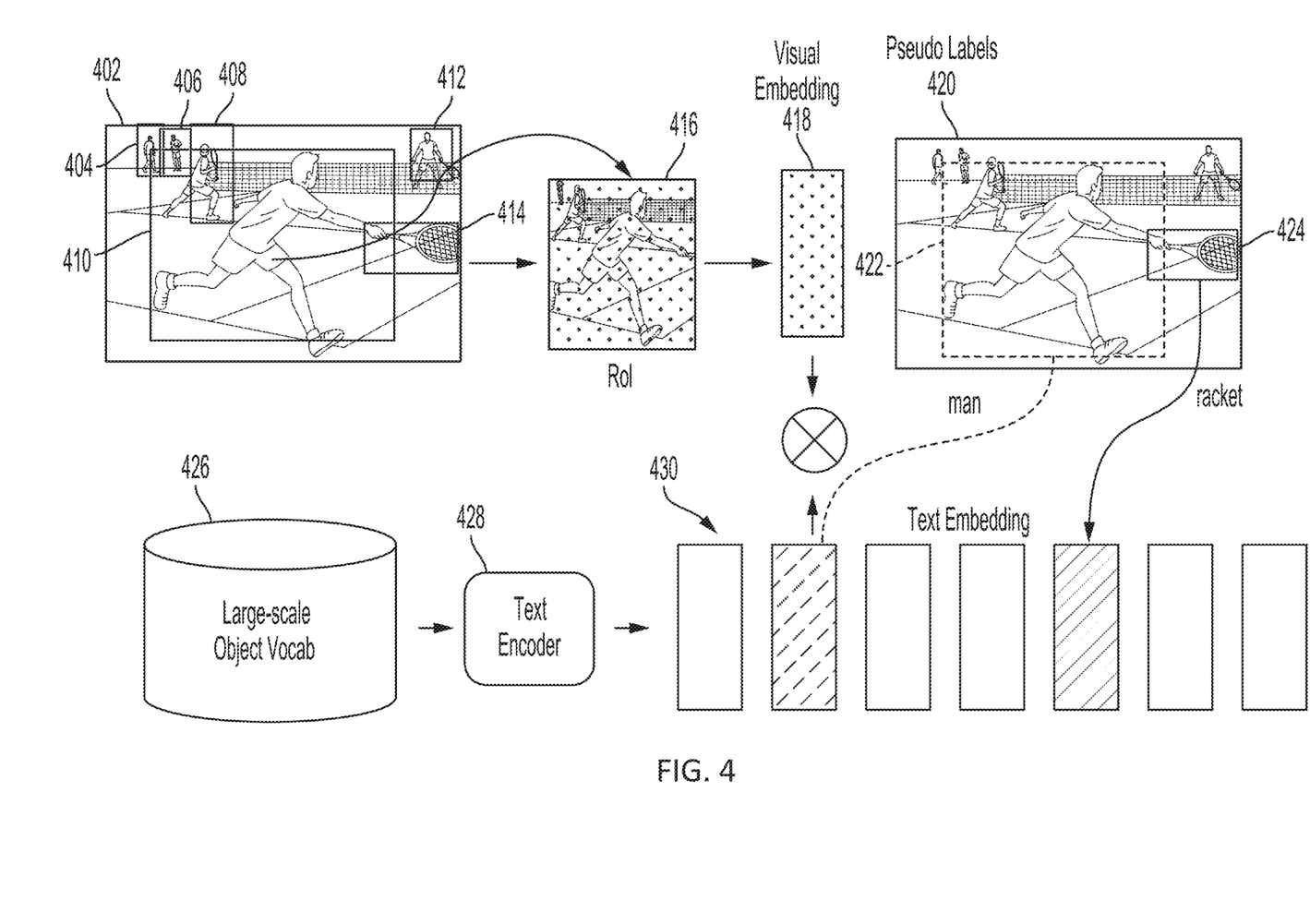
FIG. 4 is an illustration of an open vocabulary object detection method according to aspects of the present disclosure.

FIG. 4 is an illustration of an open vocabulary object detection method according to aspects of the present disclosure. The object detection method of FIG. 4 may be trained based on pseudo bounding-box labels generated as described above with reference to FIGS. 1 and 3. In this method, a feature map is extracted from an input image 402 using a feature extractor based on which object proposals are generated. Then, region-based visual embeddings, R={$r_1, r_1, \ldots, r_{Nr}$}, are obtained by RoI pooling/RoI align 416, followed by a fully connected layer, where $N_r$ denotes the number of regions, to generate visual embedding 418.

In parallel, text embeddings 430, C={bg, $c_1, \ldots, c_{Nc}$}, of object candidates from the object vocabulary 426 are acquired by a pretrained text encoder 428, where $N_c$ is the training object vocabulary size and bg indicates "background" that matches irrelevant visual regions. The goal of the open vocabulary object detector of FIG. 4 is to pull close the visual and text embeddings of the same objects and push away those of different objects. The probability $r_i$ matches $c_j$ is calculated as:

$$p(r_i \text{ matches } c_j) = \frac{\exp(r_i * c_j)}{\exp(r_i * bg) + \sum_k \exp(r_i * c_k)}$$

Where text embeddings C is fixed during training. The cross entropy loss is used to encourage the matching of positive pairs and discourage the negative ones.

During inference, given a group of object classes of interest, a region proposal will be matched to the object class if its text embedding 430 has the smallest distance to the visual embedding of the region compared to all object names in the vocabulary 426. As such, pseudo labels 420 may be generated, e.g., pseudo bounding-box label 424.

Figure 5:
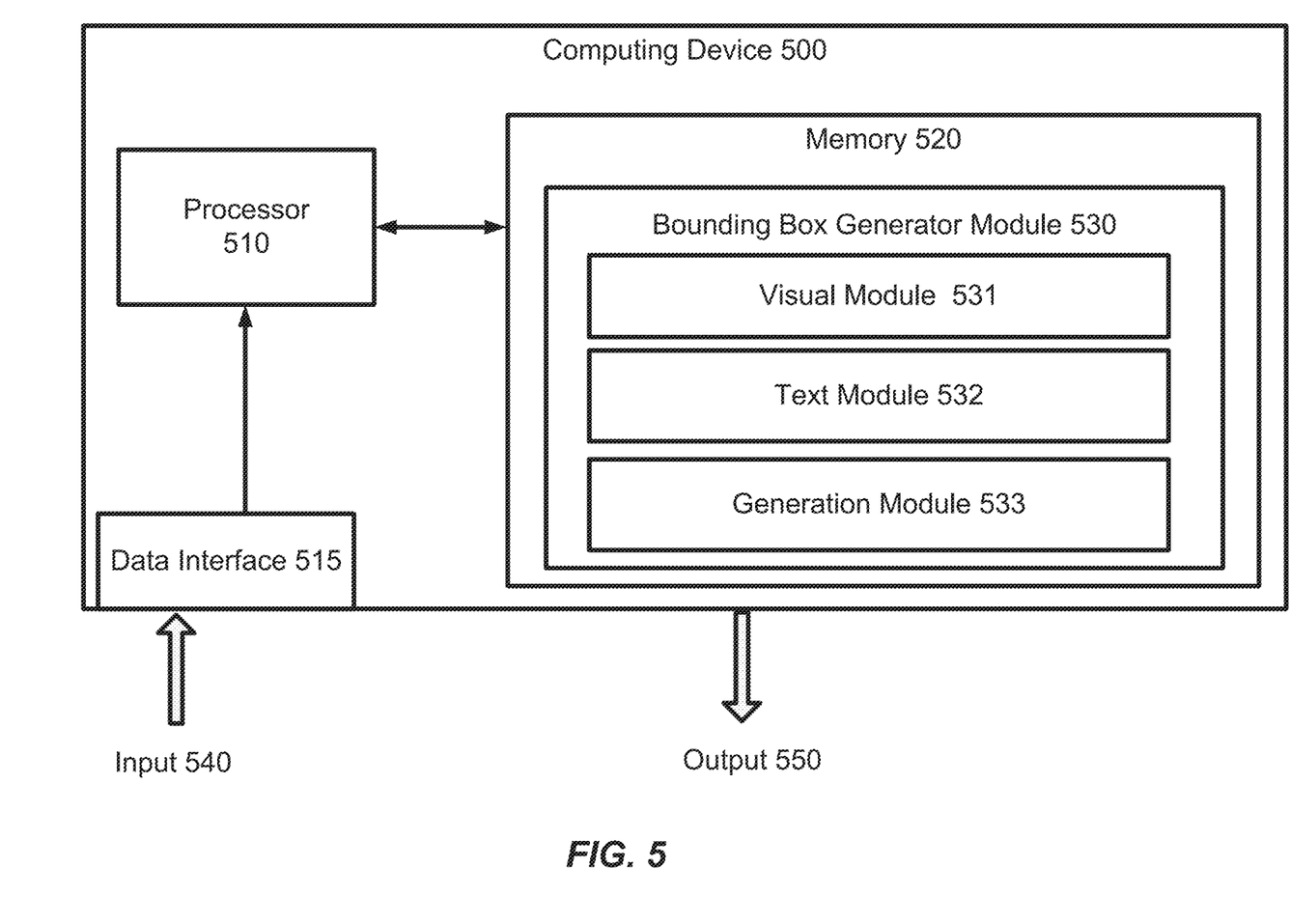
FIG. 5 is a simplified diagram of a computing device that performs open vocabulary object detection.

FIG. 5 is a simplified diagram of a computing device that implements the multi-document summarization, according to some embodiments described herein. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for a bounding box generator module 530 that may be used to implement and/or emulate the systems and models, and/or to implement any of the methods described further herein. In some examples, the bounding box generator module 530, may receive an input 540, e.g., such as a collection of image-caption pairs, via a data interface 515. The bounding box generator module 130 may generate an output 550, such as bounding box labels of the input 540.

In some embodiments, the bounding box generator module 530 further includes the visual module 531, text module 532, and a generation module 533. The visual module 531 is configured to generate a visual embedding of the images as described herein with reference to FIGS. 1-4. The text module 532 is configured to generate a text embedding of the captions as described herein with reference to FIGS. 1-4. The generation module 533 is configured to generate bounding box labels of the images based on the image-caption pairs as described herein with reference to FIGS. 1-4.

For example, visual module 531 encodes an input image and text module 532 encodes a caption associated with the image. Generation module 533 may use a multi-modal encoder with the embedded text and image as inputs. Generation module 533 may then generate an activation map by taking the final output from the multi-modal encoder and calculating its gradient with respect to the cross-attention scores. Generation module may then select a bounding box for tokens from the caption based on the activation map to generate bounding box labels of the image. In some embodiments, the output 550 is the annotated images. In some embodiments, computing device 500 further uses the annotated images to train an open vocabulary object detector, and output 550 is identified objects in an image based on the trained object detector.

Some examples of computing devices, such as computing device 500 may include non-transitory, tangible, machine readable media that include executable code that when run by one or more processors (e.g., processor 510) may cause the one or more processors to perform the processes of methods described herein. Some common forms of machine-readable media that may include the processes of methods described herein are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 6:
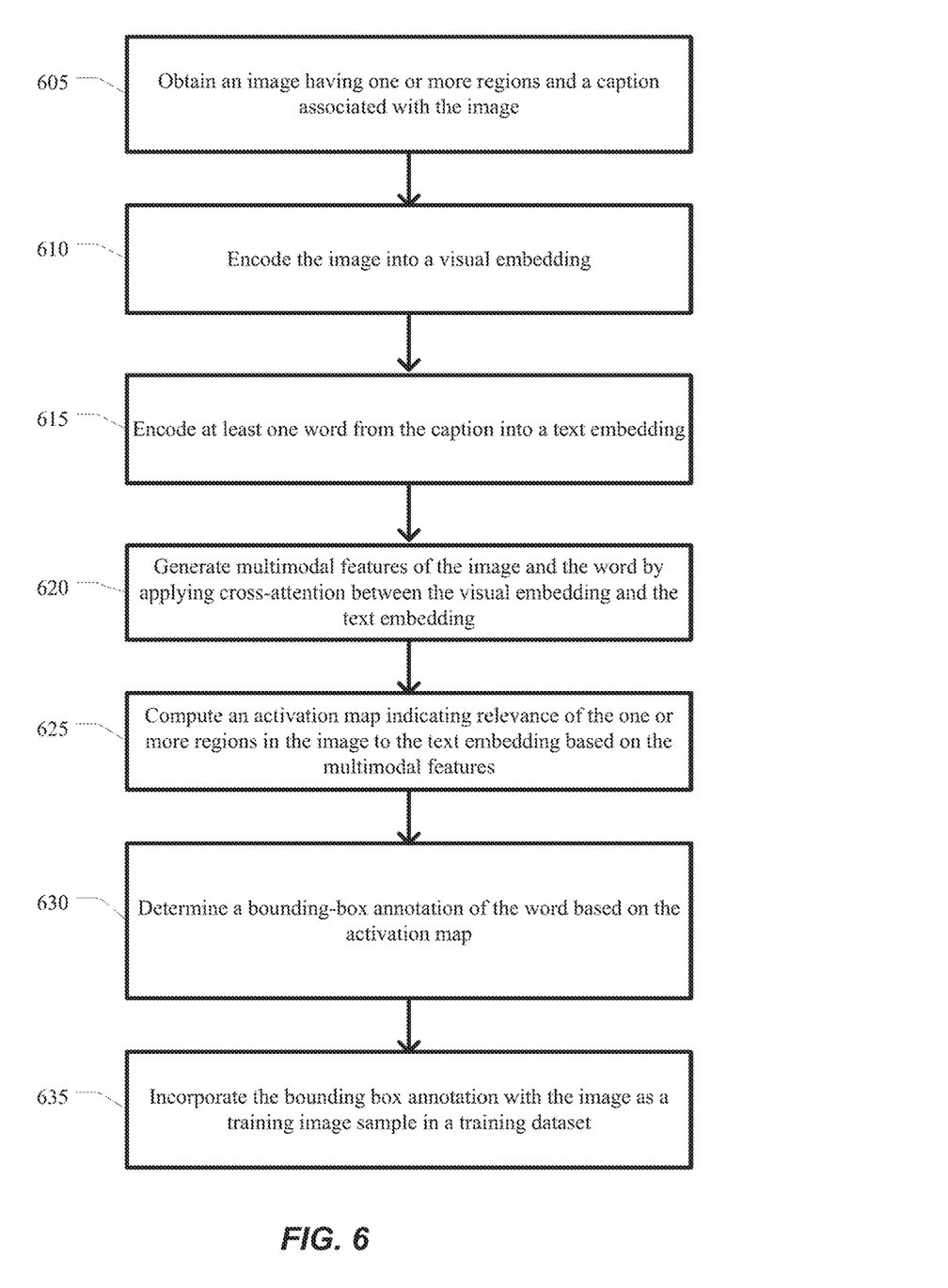
FIG. 6 provides an example logic flow diagram illustrating an example method for open vocabulary object detection, according to some embodiments.

FIG. 6 provides an example logic flow diagram illustrating an example method 600 for open vocabulary object detection, according to some embodiments. One or more of the processes described in FIG. 6 may be implemented, at least in part, in the form of executable code stored on non-transitory, tangible, machine-readable media that when run by one or more processors may cause the one or more processors to perform one or more of the processes 605-635. In some embodiments, method 600 may correspond to the methods described above with reference to FIGS. 1-5.

At block 605, a system (e.g., 500 in FIG. 5) obtains an image having one or more regions and a caption associated with the image.

At block 610, a visual encoder (e.g., 304 in FIG. 3) encodes the image into a visual embedding.

At block 615, a text encoder (e.g., 310 in FIG. 3) encodes at least one word of the caption into a text embedding.

At block 620, a multi-modal encoder (e.g., 314 in FIG. 3) generates multimodal features of the image and the word by applying cross-attention between the visual embedding and the text embedding. For example, a cross-attention layer may measure the relevance of the visual region representations with respect to a token in the caption, and calculate the weighted average of all visual region representations accordingly.

At block 625, activation map is computed indicating relevance of the one or more regions in the image to the text embedding based on the multimodal features.

At block 630, a bounding-box annotation is determined of the word based on the activation map. For example, the bounding-box annotation may be determined by first generating proposed bounding-boxes by a proposal generator (e.g., 316 of FIG. 3). The bounding-box with the best overlap with the activation map may be selected as the bounding box for the area of the image associated with the word.

At block 635, the bounding box annotation with the image is incorporated as a training image sample in a training dataset. For example, images with bounding-box annotations may be used to supervise the training of a model.

Figure 7:
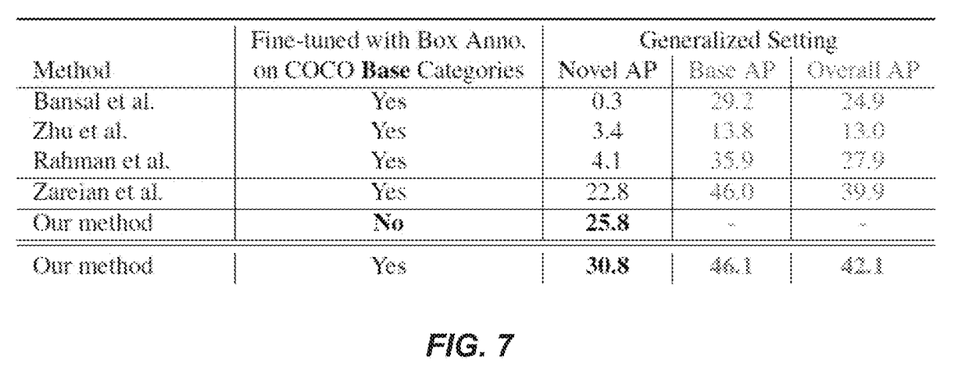
FIG. 7 is an exemplary table illustrating performance of some embodiments.

FIG. 7 is an exemplary table illustrating performance of some embodiments. Methods compared in the table include the method described in Bansal et al., Zero-shot object detection, in ECCV; the method described in Zhu et al., Synthesizing features for zero-shot detection, CVPR, pages 11693-11702, 2020; the method described in Rahman et al., Improved visual-semantic alignment for zero-shot object detection, AAAI, volume 34, pages 11932-11939, 2020; and the method described in Zareian et al., Open-vocabulary object detection using captions, CVPR, pages 14393-14402, 2021. Each of these baseline methods are trained using human-annotated images. Evaluation Datasets. Models were first evaluated on the COCO target set.

The method described herein was evaluated in two different settings. In the first setting, the model was trained without human-provided bounding boxes, trained solely with generated pseudo labels. The second setting includes fine-tuning with existing base object categories. For example, fine-tuned using COCO base categories after trained with our pseudo box labels. COCO is described in Lin et al., Microsoft coco: Common objects in context, European conference on computer vision, pages 740-755, 2014. Following the first setting, COCO detection training set is split to base set containing 48 base/seen classes and target set including 17 novel/unseen classes. All methods are trained on base classes. Two evaluation settings are used during inference. In the generalized setting, models predict object categories from the union of base and novel classes and in the non-generalized setting, models detect an object from only the list of novel classes.

Scores illustrated in FIG. 7 include novel average precision (AP), base AP, and overall AP as tested on the COCO dataset. The results in FIG. 7 show that the method described herein achieves 25.8 AP on the novel categories which significantly improves over the strongest baseline (Zareian et al.) by 3%. When also fine-tuned using COCO base categories as the baselines do, the method described herein outperforms Zareian et al. even further by 8%.

Figure 8:
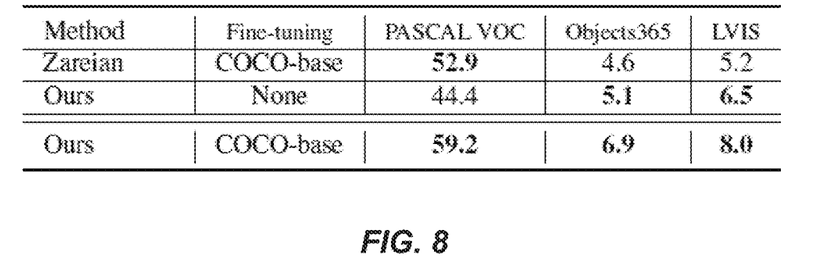
FIG. 8 is an exemplary table illustrating performance of some embodiments.

FIG. 8 is an exemplary table illustrating performance of some embodiments. Specifically, the model described herein with and without fine-tuning is compared against the Zareian model on three different tests sets. Test sets are PASCAL VOC, described in Everinham, The pascal visual object classes challenge, voc2007 results, 2007; Objects365 v2, described in Shao et al., A large-scale, high-quality dataset for object detection, Proceedings of the IEEE/CVF International Conference on Computer Vision, pages 8430-8439, 2019; and LVIS, described in Gupta et al., A dataset for large vocabulary instance segmentation, Proceedings of the IEEE Conference on Computer Vision and Pattern Recognition, 2019.

PASCAL VOC is a widely used dataset by traditional object detection methods which contains 20 object categories. Objects365 and LVIS are datasets include 365 and 1,203 object categories, respectively, which makes them very challenging in practice. When evaluating on each of these datasets (PASCAL VOC, Objects365 and LVIS), visual regions were matched to one of the object categories (including background) of the dataset during inference. The evaluation metric shown in FIG. 8 is the mean average precision (AP) over classes, with the IoU threshold set to 0.5.

The results in FIG. 8 show the generalization performance of detectors to different datasets, where embodiments of the method described herein and the baseline are not trained using these datasets. Objects365 and LVIS have a large set of diverse object categories, so evaluation results on these datasets would be more representative to demonstrate the generalization ability. The results suggest that the method described herein (without fine-tune) has already shown better performance than Zareian et al. (with finetune) on Objects365 and LVIS. When fine-tuned using COCO base set, the method described herein further improves the results surpassing the baseline by 2.3% in Objects365 and 2.8% on LVIS. The fine-tuned method beats the SOTA largely by 6.3% on PASCAL VOC. When not finetuned, the performance drops significantly on PASCAL VOC. It is very likely that there is a large semantic overlap between the COCO base categories and PASCAL VOC object categories. Therefore, fine-tuning on COCO base set helps the model's transfer ability to PASCAL VOC.

Figure 9:
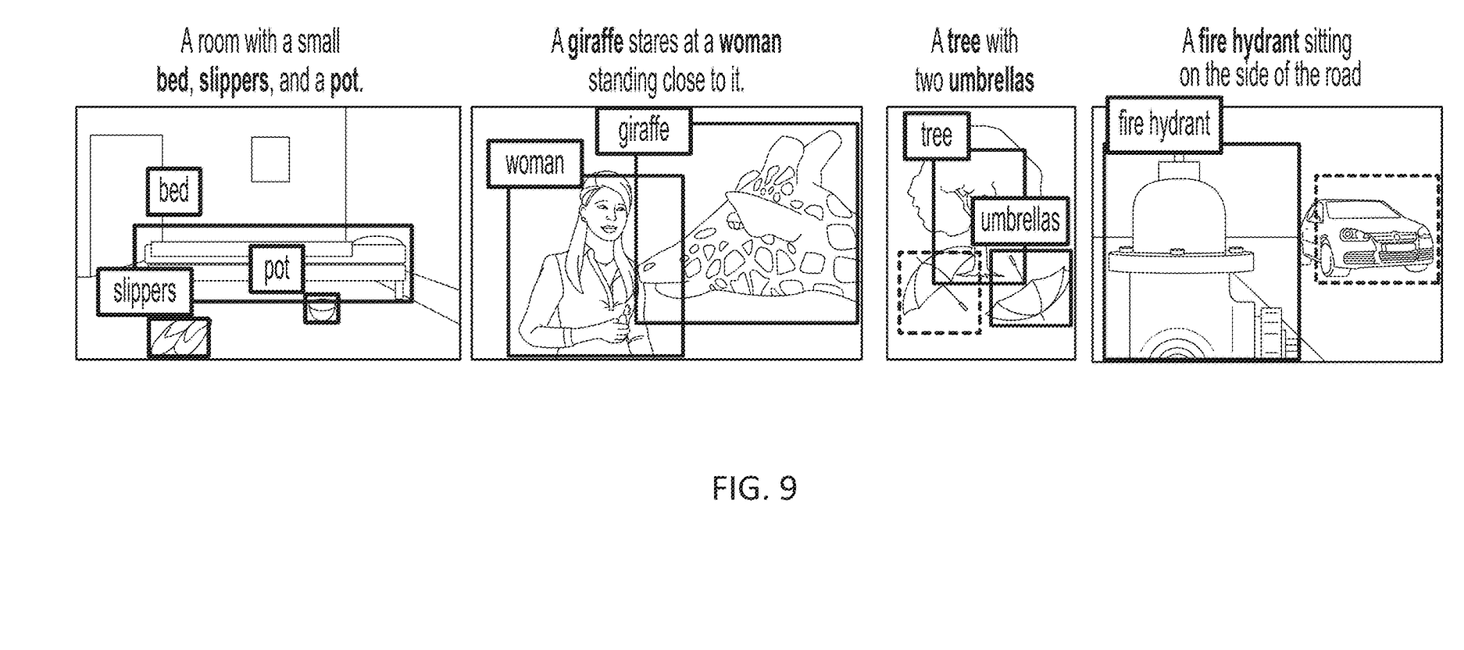
FIG. 9 is an exemplary visualization of generated pseudo bounding-box annotations.

FIG. 9 is an exemplary visualization of generated pseudo bounding-box annotations. As illustrated, the generated pseudo labels show good performance (see solid boxes) in localizing objects and are able to cover categories, e.g., pot, slippers and pie, that are not in the original object list of COCO's ground-truth annotations. However, if there are multiple instances of the same object are present in an image, the pseudo label generator may fail to capture all of them (see the dashed line box in the third column). Moreover, an object of interest may be missed if it is not in the caption (see the dashed line box in the last column). An open vocabulary object detector with such pseudo labels may be trained to support multi-instance detection with no dependency on captions.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

This application is further described with respect to the attached document in Appendix I, titled Toward Open Vocabulary Object Detection without Human-provided Bounding Boxes, 10 pages, which is considered part of this disclosure and the entirety of which is incorporated by reference.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for object detection within an image, the method comprising:
obtaining, via a data interface, the image having one or more regions and a caption associated with the image;
encoding, by an image encoder, the image into a visual embedding;
encoding, by a text encoder, at least one word from the caption into a text embedding;
generating, via a cross-attention layer, multimodal features of the image and the word by applying cross-attention between the visual embedding and the text embedding;
computing an activation map based on a gradient of a scalar that represents a similarity between the image and the caption with respect to cross-attention scores of the cross-attention layer;
determining a bounding-box annotation of the word based on the activation map; and
incorporating the bounding-box annotation with the image as a training image sample in a training dataset.

2. The method of claim 1, wherein computing the activation map comprises averaging values from all attention heads of the cross-attention layer.

3. The method of claim 1, further comprising:
training an open vocabulary object detector using the training dataset comprising the bounding-box annotation with the image.

4. The method of claim 3, further comprising:
fine-tuning the open vocabulary object detector using categories trained with human-annotated bounding-boxes.

5. The method of claim 1, further comprising:
determining the bounding-box annotation based on an overlap between a proposed bounding-box and a relevant region of the activation map.

6. The method of claim 5, wherein the proposed bounding-box is generated by a pre-trained proposal generator without reference to the caption.

7. The method of claim 1, further comprising:
training a machine learning model for object detection based on the training image sample having the bounding-box annotation as a ground truth.

8. A system for object detection within an image, the system comprising:
a memory that stores a dialogue structure extraction model;
a communication interface that obtains the image having one or more regions and a caption associated with the image; and
one or more hardware processors that:
encodes, by an image encoder, the image into a visual embedding;
encodes, by a text encoder, at least one word from the caption into a text embedding;
generates, via a cross-attention layer, multimodal features of the image and the word by applying cross-attention between the visual embedding and the text embedding;
computes an activation map based on a gradient of a scalar that represents a similarity between the image and the caption with respect to cross-attention scores of the cross-attention layer;
determines a bounding-box annotation of the word based on the activation map; and
incorporates the bounding-box annotation with the image as a training image sample in a training dataset.

9. The system of claim 8, wherein the one or more hardware processors computes the activation map by averaging values from all attention heads of the cross-attention layer.

10. The system of claim 8, wherein the one or more hardware processors further:
trains an open vocabulary object detector using the training dataset comprising the bounding-box annotation with the image.

11. The system of claim 10, wherein the one or more hardware processors further:
fine-tunes the open vocabulary object detector using categories trained with human-annotated bounding-boxes.

12. The system of claim 8, wherein the one or more hardware processors further:
determines the bounding-box annotation based on an overlap between a proposed bounding-box and a relevant region of the activation map.

13. The system of claim 12, wherein the one or more hardware processors generates the proposed bounding-box by a pre-trained proposal generator without reference to the caption.

14. The system of claim 8, wherein the one or more hardware processors further:
trains a machine learning model for object detection based on the training image sample having the bounding-box annotation as a ground truth.

15. A processor-readable non-transitory storage medium storing a plurality of processor-executable instructions for object detection within an image, the instructions being executed by a processor to perform operations comprising:
obtaining, via a data interface, the image having one or more regions and a caption associated with the image;
encoding, by an image encoder, the image into a visual embedding;
encoding, by a text encoder, at least one word from the caption into a text embedding;
generating, via a cross-attention layer, multimodal features of the image and the word by applying cross-attention between the visual embedding and the text embedding;
computing an activation map based on a gradient of a scalar that represents a similarity between the image and the caption with respect to cross-attention scores of the cross-attention layer;
determining a bounding-box annotation of the word based on the activation map; and
incorporating the bounding-box annotation with the image as a training image sample in a training dataset.

16. The processor-readable non-transitory storage medium of claim 15, wherein computing the activation map comprises averaging values from all attention heads of the cross-attention layer.

17. The processor-readable non-transitory storage medium of claim 15, the instructions being executed by the processor to perform operations further comprising:
training an open vocabulary object detector using the training dataset comprising the bounding-box annotation with the image.

* * * * *